May 21, 1929.  L. E. WHITON  1,713,801
LATHE CHUCK
Filed June 17, 1926  3 Sheets-Sheet 1

INVENTOR
Lucius E. Whiton,
ATTORNEY

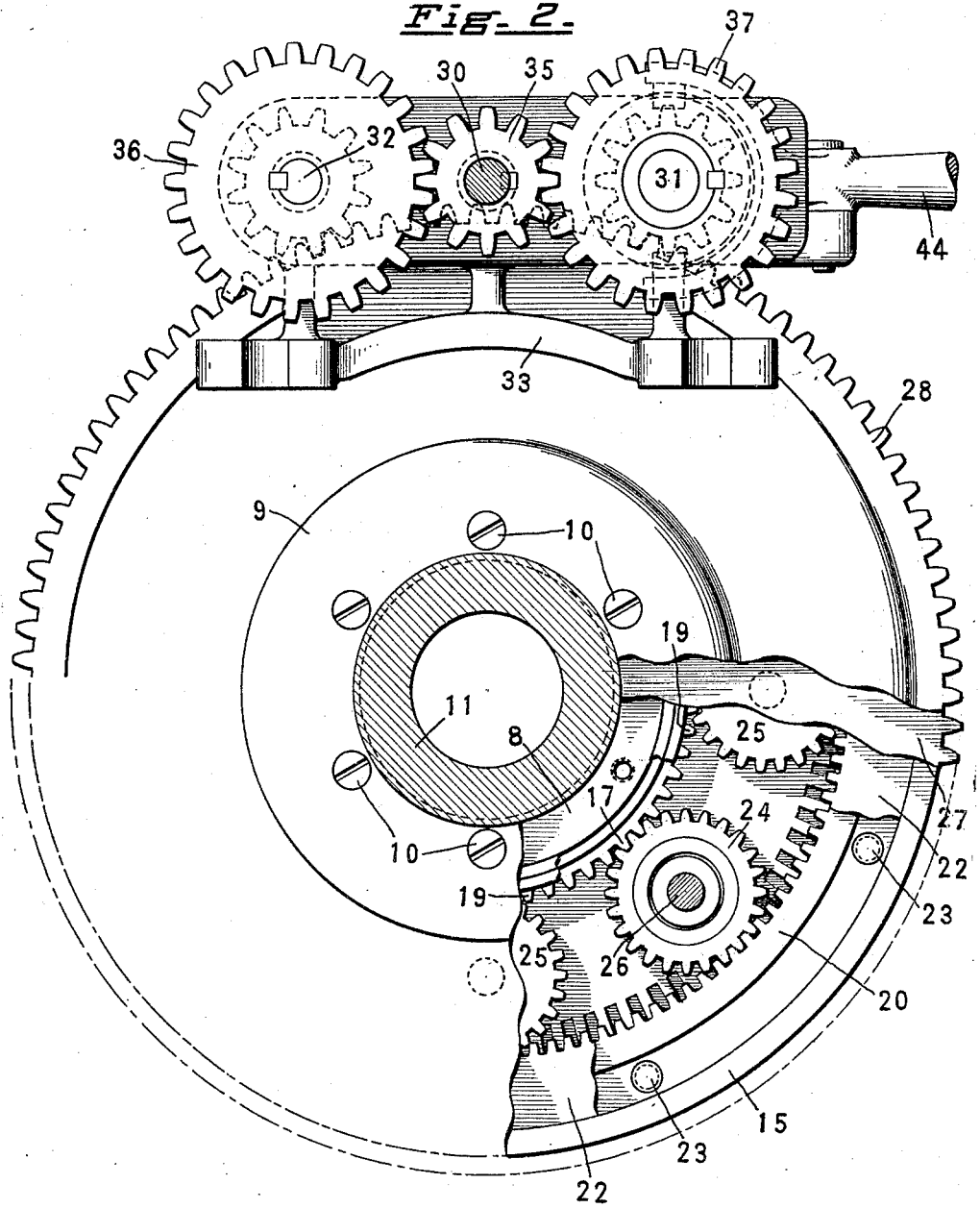

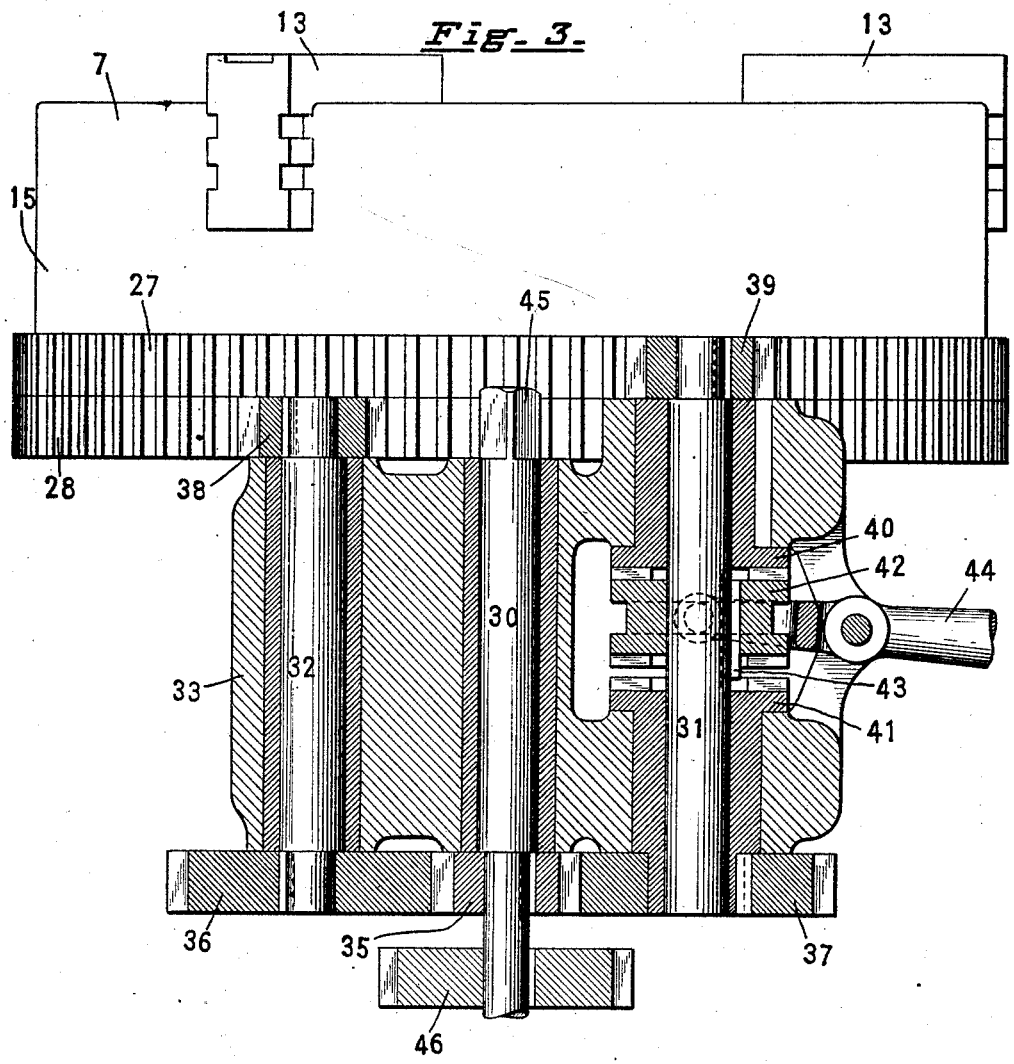

Patented May 21, 1929.

1,713,801

UNITED STATES PATENT OFFICE.

LUCIUS E. WHITON, OF NEW LONDON, CONNECTICUT.

LATHE CHUCK.

Application filed June 17, 1926. Serial No. 116,518.

My invention relates particularly to that type of chuck in which the jaws may be adjusted to grip or release the stock regardless of whether the chuck is rotating or not.

The main object is to provide a construction which will enable the operator to adjust the jaws slowly or rapidly at will and either by hand or power-actuated means.

Another object is to provide mechanism of this character which is simple and yet compact and powerful.

Another object is to provide a construction of this character which can be mounted on a hollow spindle so as to permit adjustment of stock or cutting tools through the spindle.

According to the present invention, I provide differential mechanism between the variator and the jaw adjusting member and combine such mechanism with a special gear shift whereby the differential ratios may be changed at will.

Fig. 2 is a rear view and partial section of the same.

Fig. 3 is a plan view and partial section.

Figure 1:
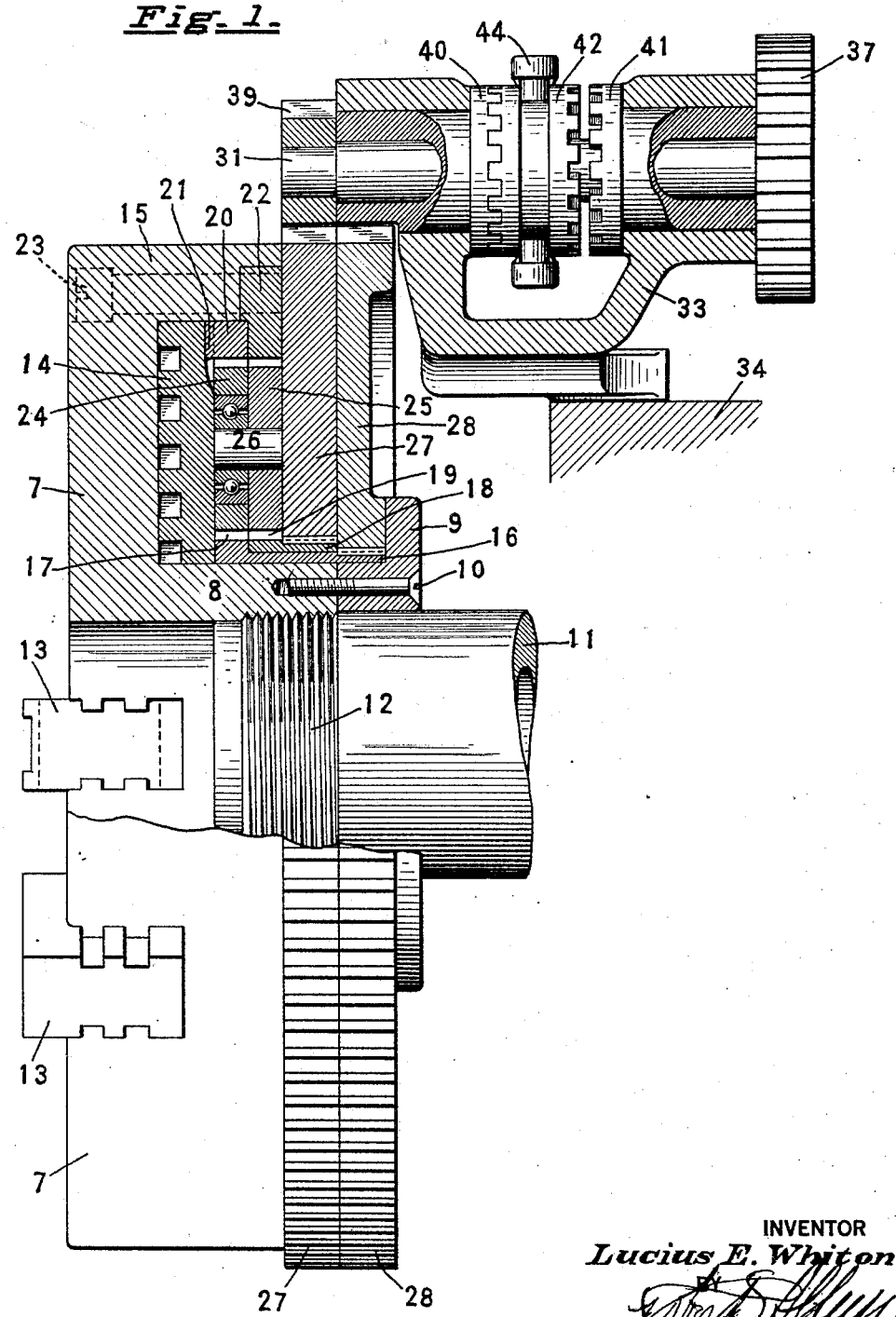
Fig. 1 is a fragmentary vertical section and side view of mechanism embodying one form of the improvements of my invention.

The chuck body 7 may be of any suitable type and provided with a hub consisting of the part 8 which is integral with the body of the chuck and the ring 9 which is secured to the part 8 in any suitable manner, as, for instance, by screws 10. A customary spindle 11 which may be hollow is provided with means for attaching the chuck, as for instance, a screw thread 12.

The chuck is provided with any suitable type of jaw, each of which has a base 13 which is radially adjustable in the body of the chuck. In the form shown, a cam or scroll plate 14 is mounted within the body on the hub 8 and within the flange 15 and is provided with a scroll thread of suitable type engaging with the jaw bases 13 in the usual manner.

A sleeve 16 which is rotatable on the hub of the chuck is provided with gear teeth 17 adjacent the back of the scroll plate 14. A second sleeve 18 mounted on the sleeve 16 is provided on gear teeth 19 corresponding with the teeth on the gear teeth 17. An annular gear ring 20 having teeth facing toward teeth 17 is mounted to rotate in the chuck body and provided with clutch teeth 21 interfitting with corresponding teeth on the rear face of the jaw adjusting member or scroll plate 14 near its periphery. Another annular gear ring 22 is mounted in the rear of the chuck with its teeth opposite the teeth on the gear 19 and secured to the chuck body, for instance, by screws 23. A series of pairs of pinions 24 and 25 mounted on studs or shafts 26 are arranged between the gears 17 and 19 and the gear rings 20 and 22, respectively.

Mounted at the back of the chuck body are two gear wheels 27 and 28 keyed, respectively, to the sleeves 18 and 16. The plate 27 serves as a bearing for the rear faces of the pinions 25 and the studs 26 and the scroll plate 14 serves as a front bearing for the same members so that the pairs of pinions 24 and 25 on their stud shafts may travel in a planetary manner about the hub of the chuck.

Normally, while the chuck is working the wheels 27 and 28 are stationary so that the sleeves 18 and 16 and their gears 19 and 17 are also stationary. This causes the planetary pinions 24 and 25 to travel around with the chuck body in mesh with the annular gear rings 20 and 22, respectively, without producing any relative motion between the scroll plate 14 and the chuck body. If either member 27 or 28 is rotated with respect to the other, a differential motion of the gears 17 and 19 with respect to each other will take place and consequently pinions 24 will be given relative rotative movement which will result in rotating the annular gear ring 20 with respect to the gear ring 22, thus moving the scroll plate 14 with respect to the chuck body and producing a corresponding radial action of the jaws 13.

To produce this differential action, I provide three shafts, 30, 31, and 32, which are rotatably mounted in a bracket 33 which is suitably supported by some part 34 of the head-stock of the lathe. The shaft 30 has keyed to it a pinion 35 which meshes with pinions 36 and 37. Pinion 36 is keyed to shaft 32. Pinion 37 is rotatable with respect to shaft 31. The shaft 32 has another pinion 38 keyed to it and meshing with the gear wheel 28. Shaft 31 has a pinion 39 keyed to it and meshing with gear wheel 27. Clutch member 40 is keyed to the bracket 33 and clutch. Clutch member 41 is keyed to pinion 37 and the shaft 31 is rotatable in the clutch members 40 and 41. An intermediate clutch member 42 is mounted to slide on the key 43 which is fixed in the shaft 31 so that the clutch member 42 will rotate with the shaft 31 but may be slid back and forth by means of the handle or lever 44. The shaft 30 may be rotated either by a hand wrench applied to the end 45 or by power, for instance, from a gear 46.

The operation of the device is dependent upon certain relations between the gear ratios, although not upon any particular ratio. For instance, according to one arrangement, gear wheel 27 may have 93 teeth and gear wheel 28, 92 teeth. In this case the pinions 38 and 39 may have 12 and 11 teeth, respectively. In this case the pinions 36 and 37 may have the same number of teeth, say, 24 and the pinion 35, say, 12 teeth. Alternatively the gears 27 and 28 may have the same number of teeth, say 93, and the gears 36 and 37 may have different numbers of teeth, say 24 and 25 respectively.

With the clutch parts in the position shown in Figs. 1 and 3, the clutch member 42 is interlocked with the stationary clutch member 40 so that the shaft 31 and the pinion 39 and gear wheel 27 must remain stationary. If, now, the shaft 30 is rotating, the pinion 35 will drive the pinion 37 and clutch member 41 idly and at the same time will drive the pinion 36, shaft 32, pinion 38, and gear 28 at a speed dependent upon the speed of rotation of the shaft 30 and the ratio of the gear train, thus producing a relative rotation of the gear wheel 28 with respect to the now stationary gear wheel 27. If the clutch member 42 be now shifted so as to engage the rotating clutch member 41, the shaft 31 and pinion 39 would be driven and in turn drive the gear wheel 27 but at a slightly different speed from the speed of the gear 28, thus changing materially the relative movement between the gear wheels 27 and 28 and producing a corresponding change in the speed of movement of the chuck jaws which are controlled by the adjusting member or scroll plate 14.

Such construction and arrangement makes it possible to operate the jaws at a maximum speed and efficiency, that is, when gripping the stock and when retracting the jaws. For instance, where there is a wide radial adjustment of the jaws, the movement may be at high speed while the jaws are moving from the periphery inward and then changed to slow speed and high power at the point where the jaws begin to grip the stock. The reverse effect is produced, of course, in releasing the jaws when considerable power may be required at the beginning of the releasing action, which would be effected slowly and then the clutch shifted so as to increase the speed as the jaws are retracted further from the stock.

While I have shown the preferred form of construction, it should be understood that I contemplate that various changes may be made in the details of construction without departing from the spirit and scope of my invention.

Certain features disclosed herein are claimed in my earlier applications #61,173 filed Oct. 8, 1925, and #101,043 filed April 10, 1926.

I claim:

1. A lathe chuck comprising a body, a jaw operating plate coacting therewith, rotatable spur gears mounted concentrically with said chuck body and having outwardly extending teeth, annular gears secured respectively to said chuck body and said jaw operating plate and having inwardly extending teeth, planetary pinions mounted to travel between said annular gears and said spur gears, rotatable gear wheels connected to rotate with said rotatable spur gears, and two shafts geared differentially to said rotatable gear wheels.

2. A chuck comprising two plates arranged next to each other, a chuck body having jaws, an adjustor for said jaws, a spur gear connected to each of said plates, annular gears connected to said body and to said adjustor respectively and having inwardly projecting teeth, pairs of planetary gears, each pair being on a common shaft and adapted to travel between said spur gears and said annular gears, means for rotating both of said plates but at different speeds and means for holding one plate stationary.

3. In a chuck two concentrically mounted relatively rotatable members, one of said members having a hub and a flange, outer annular gears secured to the outer edges of said members, a sleeve mounted on said hub and having an inner gear encircled by one of said annular gears, a second inner gear mounted on said sleeve and encircled by the other annular gear, a pair of pinions having a common shaft and interposed between said outer and inner gears, a plate secured to one of said inner gears and holding said pinions in place, clutch mechanism for holding one gear stationary while the other rotates and means for rotating both of said inner gears at different speeds.

4. In a chuck two concentrically mounted relatively rotatable members, two annular gears one of said gears having toothed coupling with one of said members and screws for securing the other gear to the other member, two spur gears arranged inside of said annular gears, pairs of connected pinions meshing with said outer and inner gears, the pinions of each pair being supported independently of the other pairs, means for rotating both of said inner gears and means for changing the relative speed of rotation.

5. A lathe chuck comprising a body, a jaw operating plate, two rotatable plates, outer and inner gears secured to two of said plates respectively, a companion gear mounted alongside of each of said outer and inner gears, said companion gears being secured to said body and to the third plate, pairs of pinions connecting said gears, each pair being mounted on a shaft and guided solely between adjacent surfaces of two of said plates, means for rotating both of said inner gears at different speeds, and means for holding one inner gear stationary while the other rotates.

6. A chuck comprising a body, a jaw operating plate mounted therein, a sleeve mounted concentrically with said body and having gear teeth arranged adjacent said plate, an annular gear connected to the periphery of said plate, a pinion mounted to travel between said gears, a gear ring mounted on said sleeve adjacent the teeth of said sleeve, an annular gear connected to the periphery of said chuck body alongside of the first mentioned annular gear, a pinion interposed between said gear ring and the second mentioned annular gear, a shaft connecting said pinions, a rotatable gear plate connected to said gear ring and forming a backing for one of said pinions and one of said annular gears, a rotatable gear plate secured to said sleeve alongside of said first gear plate, a bracket, counter shafts carried by said bracket, and pinions carried by said shafts for rotating the rotatable plates differentially.

7. A lathe chuck comprising a body having a hub, a cam plate mounted to rotate within said body on said hub, jaws connected to said plate, an annular gear secured to said cam plate and having inwardly projecting teeth, a sleeve gear rotatable on said hub, a series of pinions interposed between said gears, an annular gear connected to said body and having inwardly projecting teeth, a second sleeve gear, a rotatable plate connected to said latter gear, a series of pinions interposed between said two last-mentioned gears, shafts connecting the pinions of the two series guided between said rotatable plate and said cam plate, and means for rotating said sleeve gears at different speeds and means for disconnecting one sleeve gear while the other gear is rotating.

8. A lathe chuck comprising a body having a recess, a cam plate mounted to rotate therein, jaws connected to said plate, an annular gear connected to said plate, a sleeve having a gear rotatable in said body recess, a series of pinions interposed between said gears, an annular gear secured to said body, an outer sleeve and connected gear rotatable on the first sleeve, a series of pinions interposed between said two last-mentioned gears, and connected to the first mentioned pinions, means for rotating one of said sleeves and means for selectively rotating the other sleeve or holding it stationary.

9. In a lathe chuck, a body, a cam plate mounted to rotate therein, jaws connected to said plate, an annular gear secured to said cam plate, a gear rotatable on said body, a series of pinions interposed between said gears, an annular gear connected to said body and having inwardly projecting teeth, a rotatable gear, a driver plate supporting said latter gear, a series of pinions interposed between said two last-mentioned gears, a series of shafts connecting the pinions of the two series guided between said drive plate and said cam plate, means for rotating said second mentioned gear and speed change mechanism between said rotatable gears.

10. A lathe chuck comprising a body, a cam member mounted to rotate therein, jaws connected to said member, an annular gear having inwardly projecting teeth and a toothed connection with said cam member, a power driven spur gear rotatable in said body, a sleeve connected thereto, a series of pinions interposed between said gears, a second annular gear overlapping and holding the first annular gear and having inwardly projecting teeth, means connecting said second annular gear to said body, a power driven gear rotatable on said sleeve, a rotatable plate secured to said latter gear, a series of pinions interposed between said two last-mentioned gears, shafts connecting the pinions of the two series guided between said rotatable plate and said cam member, and clutch mechanism interposed between said power driven gears.

11. A lathe chuck comprising the combination of two concentrically mounted relatively rotatable members, one of said members having a hub, annular gears secured to said members side by side, a sleeve mounted on said hub and having a gear within one of said annular gears, a second gear mounted on said sleeve within the other annular gear, a pair of pinions having a common shaft and interposed between said outer and inner gears, gear wheels for rotating said inner gears, two countershafts and pinions on said shafts meshing with said gear wheels and having differential ratios.

12. The combination in a chuck of two concentrically mounted relatively rotatable members, one of said members having a hub, annular gears secured to said members side by side, a sleeve mounted on said hub and having a gear within one of said annular gears, a second gear mounted on said sleeve within the other annular gear, a pair of pinions having a common shaft and interposed between said outer and inner gears, a gear plate for rotating one of said inner gears, a gear plate for rotating the other inner gear, pinions for rotating said gear plates and clutch mechanism between said latter pinions.

13. A chuck having a body, a jaw operating plate mounted therein, a sleeve mounted concentrically with said body and having gear teeth arranged adjacent said plate, an annular gear connected to the periphery of said plate, a pinion mounted to travel between said gears, a gear ring mounted on said sleeve adjacent the teeth of said sleeve, an annular gear connected to the periphery of said chuck body alongside of the first mentioned annular gear, a pinion interposed between said gear ring and the second mentioned annular gear, a shaft connecting said pinions, a rotatable plate connected to said gear ring and forming a backing for one of said pinions and one of said annular gears, and a second rotatable plate secured to said sleeve alongside of said first rotatable plate, means for driving said two rotatable plates simultaneously but differentially and means for holding one plate stationary while the other rotates.

14. A chuck comprising a chuck body having adjustable jaws, an adjusting member, means for moving said adjusting member with respect to said body when said body is rotating including two gear wheels, a pinion meshing with each gear wheel, means for driving one of said pinions while the other is stationary, and means for driving said pinions simultaneously but at different speeds.

15. A chuck body, jaws operable therein, a jaw actuating scroll plate rotatable relative to the body, a pair of normally stationary gears, a pair of gears arranged concentric therewith, one of the latter gears being connected to rotate with the jaw actuator, planetary pinions mounted to travel between said pairs of gears, gear wheels keyed to the gears of the first mentioned pair, and transmission and stop mechanism for said gear wheels including means for driving said gear wheels at different speeds and means for holding one gear wheel stationary while the other is driven.

LUCIUS E. WHITON.